(12) United States Patent
Serre

(10) Patent No.: US 6,455,624 B1
(45) Date of Patent: Sep. 24, 2002

(54) LIFE OF RADIAL-CARCASS TIRES BY USING SPECIFIC COHESIVE, LOW-HYSTERESIS COMPOSITIONS

(75) Inventor: Frédéric Serre, Veyre-Monton (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/501,407

(22) Filed: Feb. 10, 2000

(30) Foreign Application Priority Data

Feb. 11, 1999 (FR) .............................. 99 01766

(51) Int. Cl.$^7$ .............................. C08K 3/04; C08K 3/36; B60C 9/02
(52) U.S. Cl. .................. 524/492; 524/493; 152/209.16; 152/548
(58) Field of Search ................................ 524/492, 493; 152/209.1, 209.16, 548

(56) References Cited

U.S. PATENT DOCUMENTS

| 3,392,773 A | | 7/1968 | Warren et al. |
| 5,804,636 A | * | 9/1998 | Nahmias et al. ............ 524/492 |

FOREIGN PATENT DOCUMENTS

| EP | 0105822 | | 4/1984 |
| EP | 0 105 882 A2 | * | 4/1984 |
| EP | 0738614 | | 10/1996 |
| EP | 0 738 614 A1 | * | 10/1996 |
| GB | 2024119 | | 1/1980 |

* cited by examiner

Primary Examiner—David W. Wu
Assistant Examiner—R. Harlan
(74) Attorney, Agent, or Firm—Baker Botts LLP

(57) ABSTRACT

The subject of the present invention is the use of cohesive, low-hysteresis compositions comprising small amounts of reinforcing fillers to produce profiled filing members arranged in the zones of the shoulder and the crown of tires in order to improve the life thereof.

10 Claims, No Drawings

LIFE OF RADIAL-CARCASS TIRES BY USING SPECIFIC COHESIVE, LOW-HYSTERESIS COMPOSITIONS

BACKGROUND OF THE INVENTION

SPECIFICATION

The present invention relates to the use of rubber compositions intended for the manufacture of tires as elastomeric internal filling compositions, also referred to as "cushion mixes", in the zones of the shoulder and the crown of a tire.

Radial-carcass tires for motor vehicles bearing heavy loads at greater or lesser speeds, in particular those for heavy vehicles, have a framework formed of reinforcements or plies of metal wires coated with elastomers. Such tires comprise, in the bottom zone, one or more bead wires and carcass reinforcement extending from one bead wire to the other and, at the crown, a crown reinforcement comprising two or more crown plies. This framework is consolidated by elastomeric compositions. Radial-carcass tires, intended to be fitted on vehicles bearing heavy loads at greater or lesser speeds, in particular those for heavy vehicles, are designed to be able to be recapped several times when the tread that is in contact with the ground is worn. This involves having available recappable carcasses which have not been subject to serious damage after wear of one or more treads.

The life of the tire can be shortened due to the appearance of damage within a rubber profiled filling member, for example a break, which may then spread as far as the inner or outer surface of the tire, with the result that the tire cover must be discarded and replaced. Examples of damage are, at the level of the shoulder of the tire, a break in the rubber profiled member of triangular shape, separating the carcass ply reinforcement from the radially inner crown ply, said break resulting from an imposed deformation stress, such as an impact against a curb or an impact against the edge of a roundabout located at a cross roads, because some roundabouts are too cramped for a highway unit With trailer to be able to pass without mounting an edge, the profile of which is frequently harsh.

It is desirable for the cohesion of the rubber internal filler mixes to be as great as possible to avoid or reduce these incipient points for damage.

It is known to the person skilled in the art that elastomeric internal filler compositions undergo deformation upon each rotation of the wheel. Such deformation causes a great amount of heating which is harmful to the life of said compositions because, at operating temperatures which are frequently above 100° C., the mechanical properties and the reinforcement degrade over time by thermochemical and/or thermo-oxidizing aging, with the consequence that the compositions become less resistant to mechanical stress.

In order to eliminate or at the very least minimize as far as possible the risks of breaking of the elastomeric internal filler mixes, i.e., those devoid of reinforcements, it is desirable for these mixes to have high mechanical cohesion as well as hysteresis loss characteristics which are as low as possible at the operating temperature of the tire.

The person skilled in the art, confronted with the problem of balancing minimal heating and high cohesion at high temperature, has proposed a large number of solutions. Thus, it has been proposed to use elastomeric internal filler compositions, i.e., cushion mixes, of relatively low hysteresis, in the form of:

(i) compositions based on natural rubber, pure or in a blend with polybutadiene, the reinforcing filler being a carbon black having a specific surface area preferably less than 110 $m^2/g$ and used in an amount of 30 to 35 phr (parts by weight per hundred parts of elastomer);

(ii) compositions based on natural rubber, pure or in a blend with polybutadiene, reinforced with a blend of carbon black and silica, the usual amounts of carbon black being from 30 to 35 phr and those of the silica from 10 to 15 phr;

(iii) compositions based on diene rubber and syndiotactic 1,2-polybutadiene as described in Patent Application JP-A-94/092108;

(iv) compositions based on natural rubber, possibly in a blend with another diene elastomer, comprising carbon black and thermoplastic polymer fibers as described in Patent Application JP-A-95/330960.

SUMMARY OF THE INVENTION

The Applicant has discovered that it is possible to obtain a balance between heating and improved cohesion and excellent resistance to the mechanical stresses with high deformation by the use of an elastomeric internal filler composition:

(i) based on natural rubber or synthetic polyisoprene having a majority of cis-1,4 bonds, used pure or in a blend with another diene elastomer, (ii) reinforced with:
either a carbon black filler used in an amount between 15 phr and 28 phr, and preferably between 20 phr and 25 phr,
or a clear filler selected from among precipitated or pyrogenic silicas comprising SiOH functions at the surface, precipitated aluminas comprising AlOH functions at the surface, a natural or precipitated silicoaluminate comprising at the surface both SiOH and AlOH groups, said clear filler being used in an amount from 15 phr to 40 phr and preferably from 20 phr to 35 phr,
or with a blend of carbon black and clear filler as described above, such that the total amount of filler is between about 15 phr and 50 phr, and that the amount of clear filler in phr is greater than or equal to that of the carbon black in phr minus 5phr.

DETAILED DESCRIPTION

In the case of using clear filler, it is necessary to use a coupling and/or covering agent selected from among the agents known to the person skilled in the art. Preferred coupling agents include, inter alia, sulphur-containing alkoxysilanes of the bis-(3-trialkoxysilylpropyl) polysulphide type, and among these in particular, bis-(3-triethoxysilylpropyl) tetrasulphide sold by DEGUSSA under the names Si69 for the pure liquid product and X50S for the solid product (blend 50/50 by weight with black N330). Covering agents include a fatty alcohol, an alkylalkoxysilane, such as a hexadecyltrimethoxy- or triethoxysilane sold by DEGUSSA under the names Si116 and Si216 respectively, diphenylguanidine, a polyethylene glycol, or a silicone oil possibly modified by means of OH or alkoxy functions. The covering and/or coupling agent is used in a ratio by weight relative to the filler of between 1/100 and 20/100, and preferably of between 2/100 and 15/100, when the clear filler represents the entire reinforcing filler, and between about 1/100 and 20/100 when the reinforcing filler comprises a blend of carbon black and clear filler.

The elastomeric internal filler compositions or cushion mixes according to the invention are, for example, triangular profiled members separating the carcass reinforcement from the radially inner crown ply, the profiled members located between crown reinforcement plies over their entire width and/or the profiled members separating the ends of the crown plies forming the crown reinforcement.

The diene elastomers which may be used in a blend with natural rubber or a synthetic polyisoprene having a majority of cis-1,4 bonds include a polybutadiene (BR), preferably having a majority of cis-1,4 bonds, a solution or emulsion styrene-butadiene copolymer (SBR), a butadiene-isoprene copolymer (BIR) or, alternatively, a styrene-butadiene-isoprene terpolymer (SBIR). These elastomers may be modified during polymerization or after polymerization by means of branching agents, such as divinylbenzene, or starring agents, such as carbonates, tin halides or silicon halides. Alternatively, the elastromers may be modified by means of functionalizing agents resulting in grafting of oxygenated carbonyl or carboxyl functions or, alternatively, an amine function, such as, for example, by the action of dimethyl- or diethylamino-benzophenone on the chain or at the ends of the chain. In the case of blends of natural rubber or of synthetic polyisoprene having a majority of cis-1,4 bonds with one or more of the diene elastomers referred to above, the natural rubber or the synthetic polyisoprene preferably comprises the majority of the blend, and, more preferably, comprises an amount greater than 70 phr.

When carbon black is used as the sole reinforcing filler, the required properties are obtained using a carbon black, or a blend of carbon blacks, the BET specific surface area of which is between 30 and 160 $m^2/g$, preferably between 90 and 150 $m^2/g$, and the DBP structure of which is between 80 and 160 ml/100 g. Preferably, the amount of black used lies within the range of the values 20 phr and 25 phr. The measurement of BET specific surface area is effected in accordance with the method of BRUNAUER, EMMET and TELLER described in "The Journal of the American Chemical Society", vol. 60, page 309, February 1938, corresponding to Standard NFT 45007 of November 1987.

When a clear filler is used as the sole reinforcing filler, the hysteresis and cohesion properties are obtained using a precipitated or pyrogenic silica, or a precipitated alumina, or alternatively an alumosilicate of BET specific surface are of between 30 and 260 $m^2/g$. Preferably an amount of filler from 20 to 35 phr is used. Non-limiting examples of this type of filler include the silicas KS404 from Akzo, Ultrasil VN2 or VN3 and BV3370GR from Degussa, Zeopol 8745 from Huber, Zeosil 175MP or Zeosil 1165MP from Rhodia, HL-SIL 2000 from PPG, etc.

In the case of a blend of carbon black with a clear filler, an amount of clear filler from 25 to 40 phr is preferably used.

Other examples of reinforcing fillers having the morphology and the SiOH and/or AlOH surface functions of the silica- and/or alumina-type materials previously described, which can be used according to the invention as partial or total replacement thereof, include carbon blacks modified either during synthesis by adding to the feed oil of the oven a compound of silicon and/or aluminum or after the synthesis by adding an acid to an aqueous suspension of carbon black in a solution of sodium silicate and/or aluminate, so as to cover the surface of the carbon black at least in part with SiOH and/or AlOH functions. As in the case of the above clear fillers, the specific surface area of the filler lies between 30 and 260 $m^2/g$, and the total amount of silica- and/or alumina-type material filler is greater than or equal to 15 phr, preferably greater than 25 phr, and less than or equal to 35 phr. Non-limiting examples of this type of carbon-containing fillers, with SiOH and/or AlOH functions at the surface, include the CSDP-type fillers described in Conference No. 24 of the ACS Meeting, Rubber Division, Anaheim, Calif., May 6th–9th 1997, and of those of Patent Application EPA-0 799 854.

Additional fillers which may also be used to obtain the diene internal filler compositions having the reinforcement and hysteresis properties according to the invention, include blends of one or more carbon blacks with one or more of the other fillers already mentioned having SiOH and/or AlOH functions at the surface, the overall amount of filler being between 15 and 50 phr, preferably between 20 and 45 phr, and the amount of filler with the SiOH and/or AlOH surface functions being greater than or equal to the amount of carbon black minus five.

Finally, with the aim of improving the working and/or the cost of the compositions according to the invention, without the hysteresis and cohesion characteristics being fundamentally changed, the filler or the blends of reinforcing fillers described above may be replaced in part by a less-reinforcing filler, such as a crushed or precipitated calcium carbonate, a kaolin, etc., on the condition that x phr of reinforcing filler is replaced by x+5 parts of less-reinforcing filler, x being less than 15 phr.

The compositions according to the invention may cross-link under the action of sulphur, peroxides or bismaleimides with or without sulphur. They may also contain the other constituents usually used in rubber mixes, such as plasticizers, pigments, antioxidants, and cross-linking accelerators, such as benzothiazole derivatives, diphenylguanidine etc.

The compositions according to the invention may be prepared using known thermomechanical working processes for the constituents in one or more steps. For example, they may be obtained by thermomechanical working in one stage in an internal mixer for 3 to 7 minutes at a speed of rotation of the blades of 50 rpm or in two stages in an internal mixer for 3 to 5 minutes and 2 to 4 minutes respectively, followed by a finishing stage effected at about 80° C., during which the sulphur and the accelerator are incorporated, in the case of a sulphur-cross-linked composition.

The invention is illustrated by the following examples, which in no way constitute a limitation to the scope of the invention.

In all the examples, unless indicated otherwise, the compositions are given in parts by weight.

In these examples, which may or may not be in accordance with the invention, the properties of the compositions are evaluated as follows:

Mooney Viscosity

The Mooney viscosity ML (1+4) is measured in accordance with Standard ASTM D1646.

Rheometry

The rheometry measurements are performed by measuring the torque on a Monsanto Model 100S rheometer. They are intended to monitor the vulcanization process by determining the time To in minutes which corresponds to the vulcanization delay and the time T99 in minutes which corresponds to 99% of the maximum torque measured.

Moduli of Elongation

The moduli of elongation are measured at 100% (ME100) and at 300% (ME300) in accordance with Standard ISO 37-1977.

Scott Break Index

These indices are measured at 23° C. or 100° C. The breaking stress (BS) is determined in MPa and the elongation at break (EB) in %.

Tearability Index

These indices are measured at 100° C. The force (TBS) is determined in MPa and the elongation at break (TEB) in % on a test piece of dimensions 10×105×2.5 mm notched at the center of its length over a depth of 5 mm.

Hysteresis Losses (HL)

The hysteresis losses (HL), or hysteresis, are measured by rebound at 60° in accordance with Standard ISO R17667 and are expressed in %.

Tom surface in $cm^2$ After Impact of a Tire Against a Curb

The tire to be tested is first baked at 77° C. for 6 weeks in a ventilated oven to simulate aging due to travel.

A heavy vehicle equipped with the tire to be tested hits a curb at very low speed at a fixed angle of less: than 20 degrees. Five passes onto the curb are effected, after which the tire is demounted and then decorticated, and the torn surface measured.

In all the tests, the compositions according to the invention are used in the form of triangular profiled members arranged between the carcass reinforcement and the radially inner crown ply.

EXAMPLE 1

The object of this example is to compare natural rubber compositions which are reinforced with carbon black. These compositions are set forth in Table 1. They comprise, in the case of test 1, a composition according to the invention with a low amount of black N115, and, in the case of test 2, a composition according to the invention with a low amount of black N326. The compositions used in tests 3 and 4 are control compositions representing the known prior art. The composition of test 3 has an amount of 35 phr of black N330 and that of test 4 comprises an amount of 50 phr of black N347. All these compositions are sulphur-vulcanizable.

The characteristics of the constituents are as follows:

Peptized natural rubber of Mooney ML (1+4) at 100° equal to 60

Antioxidant: N-(1,3-dimethyl butyl) N'-phenyl p-phenylene diamine

Soluble sulphur

Vulcanization accelerating agents

The compositions of tests 1 to 4 are obtained by processing all the ingredients, except for the sulphur and the accelerators, by thermomechanical working in one stage in an internal mixer for about 4 minutes at a speed of rotation of the blades of 50 rpm until a dropping temperature of 170° is reached, followed by a finishing stage effected at 80° C., during which the sulphur and the vulcanization accelerators are incorporated.

TABLE 1

| Composition | Test 1 Invention | Test 2 Invention | Test 3 Control | Test 4 Control |
| --- | --- | --- | --- | --- |
| Natural Rubber | 100 | 100 | 100 | 100 |
| Black N115 | 25 | — | — | — |
| Black N326 | — | 25 | — | — |
| Black N330 | — | — | 35 | — |
| Black N347 | — | — | — | 50 |
| ZnO | 5 | 5 | 2.10 | 7 |
| Stearic acid | 0.50 | 0.50 | 1.40 | 2 |
| Antioxidant | 1.50 | 1.50 | 0.70 | 1.50 |
| Sulphur | 1.60 | 1.60 | 1.75 | 2.50 |
| Accelerators | 0.54 | 0.69 | 1.00 | 0.85 |

The vulcanization is effected at 140° for a time sufficient to achieve 99% of the maximum torque at the rheometer.

The properties of these four compositions are compared. The results are set forth in Table 2.

It will be noted that for the control compositions 3 and 4, the surfaces torn during the test of impact against the curb are far greater than those obtained for compositions 1 and 2 according to the invention. It will also be noted that the elongation at break at 100° C. in the tearability test is far less for the control compositions.

TABLE 2

|  | Test 1 N115 | Test 2 N326 | Test 3 N330 | Test 4 N347 |
| --- | --- | --- | --- | --- |
| ME 100 | 1.0 | 1.0 | 1.7 | 3.2 |
| HL | 13 | 10.5 | 12 | 18 |
| Break index at 100° C. EB % | 780 | 740 | 630 | 490 |
| Tearability index at 100° C. TEB % | 400 | 180 | 80 | 85 |
| Tom surface | 9 | 32 | 87 | 103 |

EXAMPLE 2

The object of this example is to compare compositions of natural rubber reinforced with silica as a majority filler compared with control compositions based on a majority of carbon black. These compositions are set forth in Table 3. They comprise, in the case of test 5, a composition based on a majority of silica and of carbon black with Si116 as the covering agent for the silica (hexadecyltrim-ethoxysilane, from Degussa); in the case of test 6, a composition based on a majority of silica and of carbon black with polydimethyl-siloxane of a molecular weight close to 400 (PDMS) as covering agent for the silica; in the case of test 7, a composition based on a majority of carbon black and of silica bonded to the elastomer with the bonding agent X50S from Degussa, and in the case of test 3 a composition based on N330. Tests 7 and 3 represent known compositions serving as controls. All these compositions are sulphur-vulcanizable.

TABLE 3

| Composition | Test 5 Invention | Test 6 Invention | Test 7 Control | Test 3 Control |
| --- | --- | --- | --- | --- |
| Natural Rubber | 100 | 100 | 100 | 100 |
| UVN3 | 35 | 35 | 15 | — |
| Black N330 | 5 | 5 | — | 35 |
| Black N347 | — | — | 40 | — |
| X50S | — | — | 3 | — |
| Sil6 | 5.00 | — | — | — |
| PDMS | — | 2.00 | — | — |
| ZnO | 7.00 | 7.00 | 7.00 | 2.10 |
| Stearic acid | 1.00 | 1.00 | 2.00 | 1.40 |
| Antioxidant | 1.50 | 1.50 | 1.50 | 0.70 |
| Sulphur | 1.75 | 1.75 | 1.80 | 1.75 |
| Accelerators | 1.50 | 1.51 | 1.25 | 1.00 |

The compositions and vulcanizations of tests 5 to 7 and 3 are obtained under the same conditions as in Example 1.

The properties of these four compositions are compared. The results are set forth in Table 4.

TABLE 4

| Composition | Test 5 Invention | Test 6 Invention | Test 7 Control | Test 3 Control |
| --- | --- | --- | --- | --- |
| Natural Rubber | 100 | 100 | 100 | 100 |
| UVN3 | 35 | 35 | 15 | — |
| Black N330 | 5 | 5 | — | 35 |
| Black N347 | — | — | 40 | — |
| X50S | — | — | 3 | — |
| Sil6 | 5.00 | — | — | — |
| PDMS | — | 2.00 | — | — |
| ME100 | 1.0 | 1.2 | 2.9 | 1.7 |
| HL 60° | 13.5 | 15 | 18 | 12 |
| Break index at 100° C. EB % | 800 | 780 | 490 | 630 |
| Tearability index at 100° C. TEB % | 510 | 500 | 230 | 80 |
| Torn surface | 8 | 13 | 83 | 87 |

It will be noted that for the control compositions 7 and 3 the surfaces torn during the test of impact against a curb are much greater than those obtained for compositions 5 and 6 according to the invention. As in the previous example, it will be noted that the elongation at break at 100° C. in the tearability test is far less for the control compositions. As in the previous example, it will be noted that the elongation at break at 100° C. in the tearability test is far lower for the control compositions.

EXAMPLE 3

The object of this example is to compare compositions reinforced with silica as majority filler by varying the nature of the bonding and covering agents. In this example, the vulcanization system is adjusted so that the moduli of elongation at 100% are sufficiently close to draw reliable conclusions as to the effects of the parameters studied. The compositions according to the invention are set forth in Table 5. They use, in the case of tests 8, 9 and 10, compositions having silica as sole filler in an amount of 30 phr with, respectively, a coupling agent X50S (test 8), a polyethylene glycol covering agent of a molecular weight of 4000 (test 9), and another polydimethylsiloxane (PDMS) covering agent (test 10). In the case of tests 11 to 15, the reinforcing filler is formed by a blend of silica and 5 phr of N330.

TABLE 5

| Composition | Test 8 | Test 9 | Test 10 | Test 11 | Test 12 | Test 13 | Test 14 | Test 15 |
| --- | --- | --- | --- | --- | --- | --- | --- | --- |
| Natural Rubber | 100 | 100 | 100 | 100 | 100 | 100 | 100 | 100 |
| UVN3 | 30 | 30 | 30 | 25 | 30 | 35 | 30 | 35 |
| Black N330 | — | — | — | 5 | 5 | 5 | 5 | 5 |
| ZnO | 7 | 7 | 7 | 7 | 7 | 7 | 7 | 7 |
| Stearic acid | 1 | 1 | 1 | 1 | 1 | 1 | 1 | 1 |
| Antioxidant | 1.5 | 1.5 | 1.5 | 1.5 | 1.5 | 1.5 | 1.5 | 1.5 |
| X50S | 7 | — | — | — | — | — | — | — |
| PEG4000 | — | 4.3 | — | — | — | — | 4.3 | 5 |
| PDMS | — | — | 1.7 | 1.4 | 1.7 | 2.0 | — | — |
| Sulphur | 1.75 | 1.75 | 1.75 | 1.75 | 1.75 | 1.75 | 1.75 | 1.75 |
| Accelerators | 1.51 | 2.00 | 1.51 | 1.51 | 1.51 | 1.51 | 2.00 | 2.00 |

The compositions and vulcanization therefor tests 8 to 15 are obtained under the same conditions as in Example 1.

The properties of these eight compositions are compared. The results are set forth in Table 6.

TABLE 6

| Composition | Test 8 | Test 9 | Test 10 | Test 11 | Test 12 | Test 13 | Test 14 | Test 15 |
|---|---|---|---|---|---|---|---|---|
| ME100 | 1.27 | 1.16 | 0.93 | 0.96 | 1.00 | 0.98 | 1.25 | 1.37 |
| HL 60° | 9.4 | 9.6 | 11.7 | 11.4 | 12.7 | 15.6 | 11.3 | 13 |
| EB(100° C.) | 733 | 770 | 855 | 813 | 856 | 867 | 762 | 736 |
| TEB(100° C.) | 590 | 371 | 793 | 538 | 726 | 685 | 277 | 307 |
| TBS(100°) | 84 | 38 | 60 | 51 | 67 | 62 | 38 | 38 |

For tests 8, 9 and 10, it will be noted that, with an amount of silica filler which is constant and in accordance with the invention, the coupling agent X50S surprisingly provides tearability results encompassed by those obtained with the covering agent PEG4000 and the covering agent PDMS.

For tests 11, 12 and 13, in the presence of the covering agent PDMS, with an amount of black of 5 phr and an amount of silica increasing from 25 to 35 phr, the best tearability results are obtained for the intermediate amount of silica of 30 phr.

By comparing the results of tests 10 and 12, on one hand, and 9 and 14, on the other hand, it will be noted that 5 phr of carbon black added to 30 phr of silica does not fundamentally change the tearability results in the presence of the covering agents PDMS or PEG4000.

Comparison of the results of tests 14 and 15 shows that passing from 30 to 35 phr of silica in the presence of 5 phr of carbon black slightly improves the results when the covering agent PEG4000 is used, whereas the reverse effect is observed with the covering agent PDMS (tests 12 and 13).

EXAMPLE 4

The object of this example is to compare compositions reinforced with silica as sole or majority filler, where the elastomeric matrix is based on natural rubber, either pure or in a blend with another diene elastomer or based on synthetic polyisoprene having a large number of cis-1,4 bonds. These compositions are set forth in Table 7. They comprise, in the case of tests 16, 17 and 18, natural rubber filled with increasing amounts of filler. In the cases of tests 19 and 20, the natural rubber of test 18 is replaced by a blend of natural rubber with another minority diene elastomer or a cis-1,4 polybutadiene (cis-1,4 BR), obtained with a titanium-based catalyst, and a solution SBR of Mooney ML (1+4) of 54, of Tg–48° C., having a 1,2 bond content of 24% and a 16.5% styrene content. In the case of test 22, the natural rubber with 30 parts of silica filler of test 21 is replaced by a synthetic polyisoprene having a large number of cis-1,4 bonds. In the case of test 23, which is not in accordance with the invention, the blend of natural rubber and cis-1,4 BR of test 19 is filled with 30 parts of N330.

TABLE 7

| Composition | Test 16 | Test 17 | Test 18 | Test 19 | Test 20 | Test 21 | Test 22 | Test 23 Control |
|---|---|---|---|---|---|---|---|---|
| Natural Rubber | 100 | 100 | 100 | 60 | 60 | 100 | — | 60 |
| Polyisoprene | — | — | — | — | — | — | 100 | — |
| Solution SBR | — | — | — | — | 40 | — | — | — |
| cis-1,4 BR | — | — | — | 40 | — | — | — | 40 |
| UVN3 | 15 | 15 | 30 | 30 | 30 | 30 | 30 | — |
| N330 | — | 15 | 15 | 15 | 15 | — | — | 30 |
| Si116 | 2 | 2 | 4 | 4 | 4 | 4 | 4 | — |
| ZnO | 5 | 5 | 5 | 5 | 5 | 5 | 5 | 5 |
| Stearic acid | 1 | 1 | 1 | 1 | 1 | 1 | 1 | 1 |
| Antioxidant | 1.5 | 1.5 | 1.5 | 1.5 | 1.5 | 1.5 | 1.5 | 1.5 |
| Diphenylguanidine | 0.2 | 0.2 | 0.4 | 0.4 | 0.4 | 0.4 | 0.4 | — |
| Sulphur | 1.6 | 1.6 | 1.6 | 1.6 | 1.6 | 1.6 | 1.6 | 1.6 |
| Accelerators | 1.0 | 0.55 | 0.55 | 0.55 | 0.55 | 1.0 | 1.0 | 0.55 |

The compositions and vulcanization thereof for tests 16 to 23 are obtained under the same conditions as in Example 1.

The properties of these eight compositions are compared. The result are set forth in Table 8.

TABLE 8

| Composition | Test 16 | Test 17 | Test 18 | Test 19 | Test 20 | Test 21 | Test 22 | Test 23 Control |
|---|---|---|---|---|---|---|---|---|
| Natural Rubber | 100 | 100 | 100 | 60 | 60 | 100 | — | 60 |
| Polyisoprene | — | — | — | — | — | — | 100 | — |
| Solution SBR | — | — | — | — | 40 | — | — | — |
| cis-1,4 BR | — | — | — | 40 | — | — | — | 40 |
| UVN3 | 15 | 15 | 30 | 30 | 30 | 30 | 30 | — |
| N330 | — | 15 | 15 | 15 | 15 | — | — | 30 |
| ME100 | 0.85 | 0.91 | 0.93 | 0.87 | 0.97 | 0.97 | 0.69 | 1.26 |
| HL | 5.4 | 11.0 | 16.5 | 24.4 | 25.2 | 8.2 | 11.5 | 12.8 |
| EB(100° C.) | 834 | 809 | 845 | 864 | 830 | 820 | 857 | 564 |
| TEB(100° C.) | 578 | 359 | 456 | 401 | 474 | 552 | 626 | 146 |
| TBS(100° C.) | 36 | 31 | 41 | 25 | 34 | 36 | 28 | 18 |

For the compositions according to the invention of tests 16 to 22, the characteristics of elongation at, break in the tearability test at 100° C. are far higher than those obtained with the composition not in accordance with the invention continuing 30 phr of carbon black. The natural rubber or a synthetic cis-1,4polyisoprene or a blend of natural rubber as majority with another diene elastomer make it possible to obtain high cohesion with the silica filler or blends of silica and carbon black according to the invention.

In summary, the use of the compositions of the invention either with a carbon black filler used in an amount close to 25 phr or with a white filler of the silica and/or alumina type used alone or in a majority amount of about 35 phr, independently of whether a coupling or covering agent is used, makes it possible to show that the effects of mechanical stresses of the type of deformation imposed are less damaging than to known compositions based on carbon black as the sole or majority filler. The compositions of the invention make it possible to increase the lie of the tire, even more so since said compositions are of low hysteresis, with the consequences of lower internal heating during travel and reduced thermal and/or thermo-oxidizing degradation of the carcass reinforcement.

Of course, the invention is not limited to the examples of embodiment described previously, from which other embodiments can be conceived of.

I claim:

1. An elastomeric internal filler mix for the shoulder zone of a tire comprising a composition of natural rubber or synthetic polyisoprene having a majority of cis-1,4 bonds and a reinforcing filler selected from the group consisting of:
   (i) carbon black having a BET specific surface area of between 30 and 160 m²/g, in an amount of between about 15 phr and 28 phr,
   (ii) a white filler of the silica and/or alumina type comprising SiOH and/or AlOH surface functions, which is selected from the group consisting of precipitated or pyrogenic silicas, aluminas or aluminosilicates and carbon blacks modified during or after synthesis having a specific surface area of between 30 and 260 m²/g in an amount of between about 15 phr and 40 phr, and
   (iii) a blend of the carbon black of (i) and the white filler of (ii), in which the total amount of filler is between about 15 phr and 50 phr and the amount in phr of white filler is greater than or equal to the amount of carbon black in phr minus 5.

2. The elastomeric filler mix of claim 1 wherein the composition further comprises an additional diene elastomer, wherein the natural rubber or synthetic polyisoprene comprises the majority of elastomer in the composition.

3. The elastomeric filler mix of claim 2 wherein the additional diene elastomer is selected from the group consisting of a polybutadiene having a majority of cis 1,4 bonds, a butadiene/styrene emulsion or solution copolymer having a majority of trans-1,4 bonds, a butadiene/isoprene copolymer, and a styrene/butadiene/isoprene terpolymer.

4. The elastomer mix of claim 3 wherein the diene elastomer is modified on the chain or at the end of a chain by an engrafted carbon black filler, a SiOH or starred by a starring agent selected from the group consisting of a carbonate, a tin halide and a silicon halide.

5. The elastomeric filler mix of claim 1 wherein the carbon black has a BET specific surface area of between 90 and 150 m²/g.

6. The elastomeric filler mix of claim 1 wherein the composition comprises a carbon black filler as sole filler in an amount of 20 to 25 phr.

7. The elastomeric filler mix of claim 1 wherein the composition comprises a white filler as sole filler in an amount of 20 to 35 phr.

8. The elastomeric filler mix of claim 1 wherein the composition comprises a coupling agent and/or covering agent in an amount of between 1/100 and 20/100 by weight of reinforcing white filler.

9. The elastomeric filler mix of claim 8 wherein the composition comprises a coupling agent and/or covering agent in an amount of between 2/100 and 15/100 by weight of reinforcing white filler.

10. A profiled member located in the shoulder and crown zones of a tire between the carcass reinforcement and the crown plies and/or between the crown plies or over their entire width or between the ends of one or more of said crown plies comprising the elastomeric filler mix of any of claims 1–9.

* * * * *

UNITED STATES PATENT AND TRADEMARK OFFICE
CERTIFICATE OF CORRECTION

PATENT NO. : 6,455,624 B1
DATED : September 24, 2002
INVENTOR(S) : Serre

It is certified that error appears in the above-identified patent and that said Letters Patent is hereby corrected as shown below:

<u>Title page, Item [54] and Column 1, lines 1-3,</u>
Title, "LIFE Of RADIAL-CARCASS TIRES BY USING SPECIFIC COHESIVE, LOW-HYSTERESIS COMPOSITIONS" should read -- IMPROVEMENT IN THE LIFE OF RADIAL-CARCASS TIRES BY USING SPECIFIC COHESIVE, LOW-HYSTERESIS COMPOSITIONS --

<u>Column 1,</u>
Line 42, "With" should read -- with --

<u>Column 2,</u>
Line 50, "5phr" should read -- 5 phr --

<u>Column 3,</u>
Line 27, "elastromers" should read -- elastomers --
Line 55, "alumosilicate" should read -- aluminosilicate --

<u>Column 5,</u>
Line 34, "Tom" should read -- Torn --

<u>Column 6,</u>
Line 45, "Tom" should read -- Torn --
Line 55, "(hexadecyltrim-ethoxysilane," should read -- (hexadecyltrimethoxysilane, --

<u>Column 7,</u>
Line 10, "Sill6" should read -- Si116 --
Line 37, "Sill6" should read -- Si116 --

<u>Column 8,</u>
Line 7, "Tom" should read -- Torn --

<u>Column 9,</u>
Line 1, "these: eight" should read -- these eight --

UNITED STATES PATENT AND TRADEMARK OFFICE
CERTIFICATE OF CORRECTION

PATENT NO.     : 6,455,624 B1
DATED          : September 24, 2002
INVENTOR(S)    : Serre It is certified that error appears in the above-identified patent and that said Letters Patent is hereby corrected as shown below:

Column 11,
Line 21, "at, break" should read -- at break --
Line 24, "continuing" should read -- containing --
Line 25, "cis-1,4polyisoprene" should read -- cis-1,4 polyisoprene --
Line 40, "lie" should read -- life --

Column 12,
Line 37, "SiOH" should read -- SiOH or AlOH surface function, --

Signed and Sealed this

Thirteenth Day of May, 2003

JAMES E. ROGAN
*Director of the United States Patent and Trademark Office*